United States Patent [19]

Maki et al.

[11] Patent Number: 4,958,492
[45] Date of Patent: Sep. 25, 1990

[54] METHOD OF CONTROLLING CLUTCH OPERATION FOR A VEHICLE AND METHOD OF DETERMINING CLUTCH ENGAGEMENT COMPLETION

[75] Inventors: Kazuya Maki, Aichi; Yoshikazu Ishikawa; Kouji Yamaguchi, both of Saitama; Koji Sasajima, Tokyo, all of Japan

[73] Assignee: Honda Giken Kogyo Kabushiki Kaisha, Tokyo, Japan

[21] Appl. No.: 247,410

[22] Filed: Sep. 21, 1988

[30] Foreign Application Priority Data

| Sep. 21, 1987 | [JP] | Japan | 62-236812 |
| Sep. 21, 1987 | [JP] | Japan | 62-236806 |
| Sep. 21, 1987 | [JP] | Japan | 62-236811 |
| Oct. 12, 1987 | [JP] | Japan | 62-256717 |
| Oct. 14, 1987 | [JP] | Japan | 62-259224 |

[51] Int. Cl.$^5$ .............................. F16H 61/46
[52] U.S. Cl. ........................ 60/327; 60/468; 60/487; 74/866
[58] Field of Search .............. 180/307; 60/327, 445, 60/448, 449, 459, 468, 469, 487, 488, 489, 494; 74/866; 364/424.1

[56] References Cited

U.S. PATENT DOCUMENTS

| 3,740,951 | 6/1973 | Mori | 60/465 |
| 4,111,074 | 9/1978 | Northup | 74/867 |
| 4,648,496 | 3/1987 | Petzold et al. | 192/0.076 |
| 4,745,748 | 5/1988 | Hayashi et al. | 60/489 |
| 4,776,165 | 10/1988 | Iino | 60/468 X |
| 4,782,934 | 11/1988 | Takano et al. | 192/0.073 |
| 4,864,823 | 9/1989 | Ikejiri et al. | 60/488 |

FOREIGN PATENT DOCUMENTS

| 0127085 | 12/1984 | European Pat. Off. . |
| 0193412 | 9/1986 | European Pat. Off. . |
| 0198694 | 10/1986 | European Pat. Off. . |
| 0198695 | 10/1986 | European Pat. Off. . |
| 0209286 | 1/1987 | European Pat. Off. . |
| 0231059 | 8/1987 | European Pat. Off. . |
| 0240178 | 10/1987 | European Pat. Off. . |
| 2881 | 1/1980 | Japan . |
| 56-95722 | 8/1981 | Japan . |
| 207229 | 9/1986 | Japan . |
| 127562 | 6/1987 | Japan . |
| 237164 | 10/1987 | Japan . |
| 2158542 | 11/1985 | United Kingdom . |

*Primary Examiner*—Carl D. Price
*Assistant Examiner*—George Kapalas
*Attorney, Agent, or Firm*—Lyon & Lyon

[57] ABSTRACT

A method of controlling clutch operation, for a vehicle having a transmission and clutch means comprises setting a reference capacity of said clutch means corresponding to a parameter representing vehicle speed and an accelerator opening representing the driver's intention of acceleration or deceleration: and controlling said degree of the engine power transmitted to the wheels by adjusting the capacity of said clutch means so as to coincide with said reference capacity.

An embodiment of the method includes a method of determining clutch engagement completion in continuously variable speed transmission comprises setting a lower limit of an expected clutch engagement completion vehicle speed corresponding to an accelerator opening representing operator's intention of acceleration and deceleration, determining, in vehicle start, that said clutch valve is closed to engage the clutch completely when it is detected that vehicle speed has been below the lower limit and the opening of said clutch valve has been below a given opening, and permitting successive speed ratio control.

9 Claims, 10 Drawing Sheets

METHOD OF CONTROLLING CLUTCH OPERATION FOR A VEHICLE AND METHOD OF DETERMINING CLUTCH ENGAGEMENT COMPLETION

BACKGROUND OF THE INVENTION

This invention relates to a method of controlling clutch means for controlling the amount (degree) of power transmitted to wheels from an engine through a transmission and a method of determining the completion of clutch engagement.

This invention also relates to a method of controlling clutch opening for a constant power transmission and for bringing the vehicle into a creep state, when a transmission is in a running range and a throttle opening is below a given value.

So far there have been various types of clutch means such as the friction clutch plate type etc. used in connection with vehicle transmission.

To cite an example, in a clutch device disclosed in Japanese Patent (laid-open) publication No. 56(1981)-95722, a bypass line is provided between two hydraulic lines forming a closed circuit in a transmission with a hydraulic pump and a hydraulic motor, and a clutch valve is disposed in the bypass line to adjust the opening thereof. The controller for controlling the operation of the clutch valve is provided along with a first detection means for detecting engine speed and a second detection means for detecting throttle opening. The controller is so constructed as to deliver a control force proportional to engine speed to move the aforesaid clutch valve in a closing direction, and another control force proportional to throttle opening to move the aforesaid clutch valve in an opening direction.

In other words, in the aforesaid clutch device, a reference engine speed is set in correspondence to the throttle opening, and the clutch opening is controlled so that the actual engine speed agrees with the reference engine speed.

In this connection, to prevent an unnecessary or excessive increase in engine speed accompanying an increase in engine power in the vehicle start, it is necessary to timely select and properly control the opening of the bypass line, (the opening of the clutch valve) to have an appropriate initial load on the engine while the engine is idling. When the accelerator pedal is abruptly depressed to start the vehicle, the increase signal of throttle opening according to the depression of the accelerator pedal can be promptly inputted to the controller. But an increase in engine speed following the opening of the throttle valve is slightly delayed, and therefore the increase signal of engine speed is inputted to the controller with a slight time delay. Therefore, there may occur an instance when the engine speed is not fully imposed on the controller although the throttle opening is wide and a reference engine speed is high. Then a control action will be initiated corresponding to this condition to enlarge the opening of the bypass line, (to move clutch opening in the open direction. This may result in the engine speed unnecessarily increasing and exceeding the reference engine speed since the load on the engine is very low. Moreover, that excessive engine speed then is inputted to the controller, the clutch valve is rapidly actuated in the closing direction, thus failing to obtain a proper partial clutch engaged state, causing hunting or other jerky starting of the vehicle.

SUMMARY OF THE INVENTION

It is an object of the invention to provide a method of controlling a clutch to start and stop vehicles smoothly.

It is another object of the invention to provide a method of controlling a clutch properly to start and stop vehicles smoothly without being affected by deterioration with age and variations in the characteristics of the clutch device.

It is a further object of the invention to provide a clutch control method which can exactly determine the completion of clutch engagement in clutch control.

It is another important object of the invention to provide a method for proper clutch control which is not affected by oil temperature in vehicles using a hydraulic transmission.

And it is an additional object of the invention to provide a clutch control method which can obtain a constant creep force without being affected by the variations of engine load while vehicles are in a creep condition.

The further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
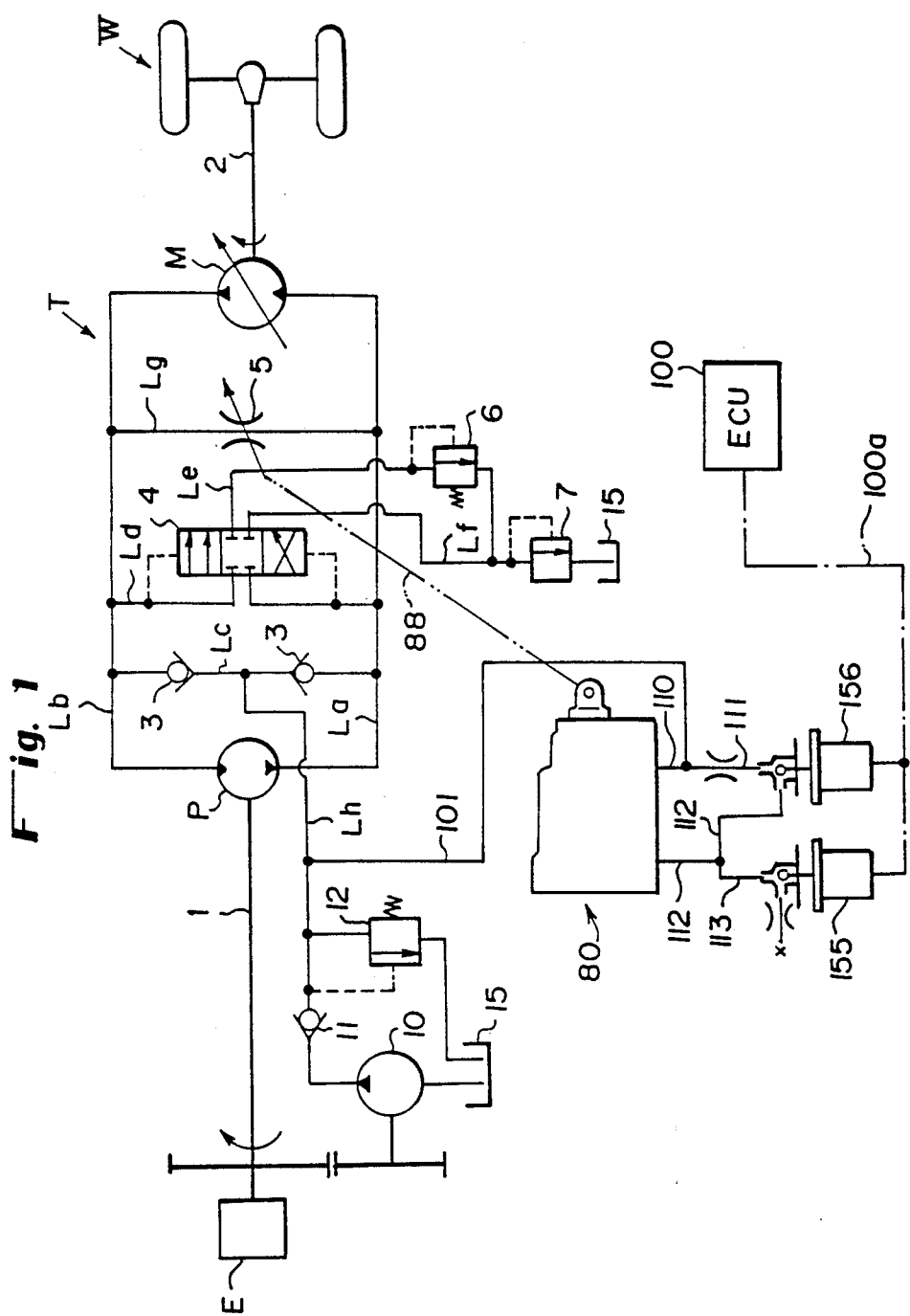
FIG. 1 is a hydraulic oil circuit diagram of a continuously variable speed transmission whose clutch is controlled by a method in accordance with the invention.

FIG. 1 shows a hydraulic circuit diagram of a continuously variable speed transmission provided with a controller and employing the first embodiment according to the invention. The continuously variable speed transmission has a constant displacement hydraulic pump P driven by the engine E through the input shaft 1 and a variable displacement hydraulic motor M connected to the output shaft 2 driving the wheels W. The hydraulic pump and motor P and M constitute a closed hydraulic circuit along with two hydraulic lines: the first hydraulic line La by which the delivery port of the pump P communicates with the suction port of the motor M, and the second hydraulic line Lb by which the suction port of the pump P communicates with the delivery port of the motor M.

A charge pump 10 driven by the engine E is connected to the closed circuit through a charge hydraulic line Lh having a check valve 11 and through a third hydraulic line Lc having a pair of check valves 3 and 3. Hydraulic oil pumped up by the charge pump 10 from an oil sump 15 with its pressure regulated by a charge pressure relief valve 12 is supplied to a lower pressure side of the aforesaid hydraulic lines La and Lb through the check valves 3 and 3. A fourth hydraulic line Ld having a shuttle valve 4 is connected to the aforesaid closed circuit. To the shuttle valve 4 is connected fifth and sixth hydraulic lines Le and Lf which respectively have a high pressure relief valve 6 and a low pressure relief valve 7 with outlets into the oil sump 15. The shuttle valve 4 is a 2-port 3-position selector valve, which operates in response to a hydraulic pressure difference of the first and second hydraulic lines La and Lb to shift to either of the extreme positions to connect either of the first or second hydraulic lines La or Lb having higher pressure to the fifth hydraulic line Le as well as to connect the other hydraulic line La or Lb having lower pressure to the sixth hydraulic line Lf. Therefore, the relief hydraulic pressure of a higher pressure-side line is regulated by the high pressure relief valve 6, and the relief hydraulic pressure of the other lower pressure-side line is regulated by the low pressure relief valve 7. When the pressures in hydraulic lines La and Lb are equal, the valve 4 is in the central position for closing line Ld.

Between the first and second hydraulic lines La and Lb is provided a seventh hydraulic line Lg to short cut the circuit between both lines. The seventh hydraulic line Lg is provided with a clutch valve 5, which is throttle valve to control the opening degree or hydraulic resistance of the line. Therefore, the throttle control of the clutch valve 5 can effect clutch control to control the transmission of driving force from the hydraulic pump P to the hydraulic motor M.

The engine E drives the hydraulic pump P, the hydraulic pressure generated by the pump P drives the hydraulic motor M for rotation which is transmitted to the wheels W through the output shaft 2 to drive the wheels W. The hydraulic motor M can be, for example, a swash plate type axial piston motor which permits the speed reduction ratio of the continuously variable speed transmission T to be steplessly changed by controlling the tilt angle of the swash plate. Explanation of the control method of the swash plate is omitted because it is well known.

On the other hand, the operational control of aforesaid clutch valve 5 is made by a clutch servo unit 80, which is controlled by a pair of solenoid valves 155 and 156 that are duty ratio controlled by a signal from the controller 100. To the controller 100 are inputted an engine speed signal Ne, a throttle position signal $\theta$th, a swash plate tilt angle signal $\theta$tr of the hydraulic motor M, an opening degree $\theta$acc of the acceleration pedal pressed by the operator, a vehicle speed signal V etc., all in a conventional manner using appropriate sensors (not shown). These signals are combined to issue a signal for controlling aforesaid solenoid valves to obtain a desirable vehicle running. The "zero" opening degree of $\theta$acc means that the acceleration pedal is fully released.

Figure 2:
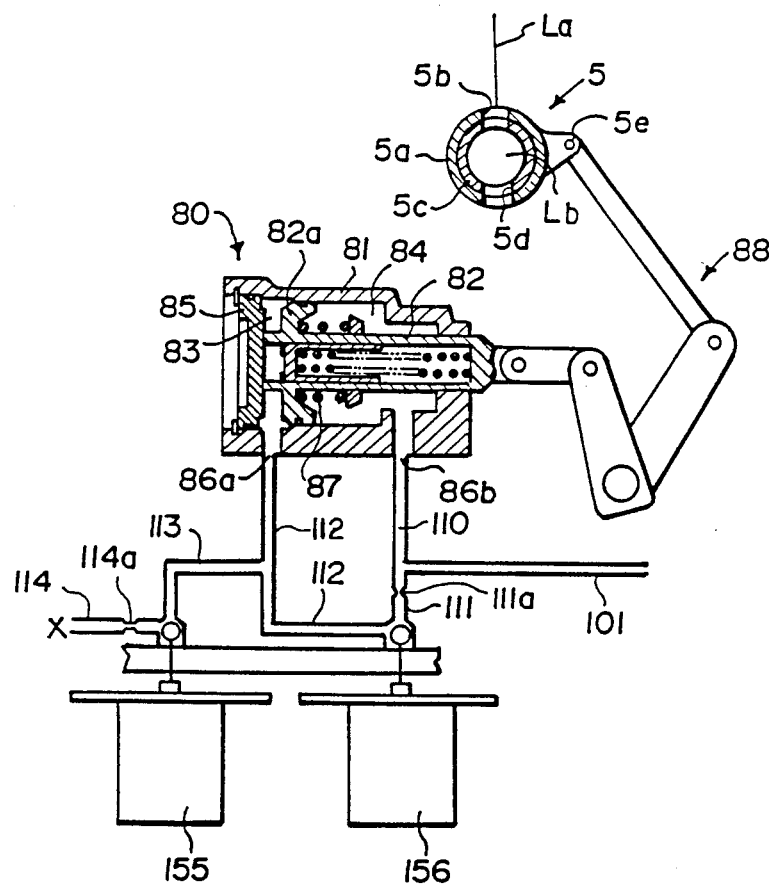
FIG. 2 is a cross-sectional view of the clutch servo unit in FIG. 1.

The following is a detailed description of the construction of the clutch servo unit 80 and the operation and control of the clutch servo unit 80 by the solenoid valves 155 and 156 and ECU 100 (refer to FIGS. 1 and 2):

The clutch servo unit 80 consists of a cylinder member 81, a piston member 82 inserted in the cylinder member 81 and slidable to the right and left in FIG. 2, a cover member 85 fixed to cover the cylinder chamber into which the piston member 82 is inserted, and a spring 87 pushing the piston member 82 to the left in FIG. 2. A piston 82a on the piston member 82 divides aforesaid cylinder member 81 into a left cylinder chamber 83 and a right cylinder chamber 84 to which hydraulic lines 112 and 110 are respectively connected via respective ports 86a and 86b.

The hydraulic oil in the hydraulic line 110 is supplied from the charge pump 10 (whose delivery pressure is regulated by the charge pressure relief valve 12) through a hydraulic line 101, while the hydraulic oil in the hydraulic line 112 is supplied from the hydraulic line 101 through a hydraulic line 111, and passes through an orifice 111a in the line 111, and the hydraulic oil pressure is controlled by the two duty-ratio-controlled solenoid valves 155 and 156. Here, the solenoid valve 156 is provided to control the flow rate of the hydraulic oil flowing from the line 111 (having the orifice 111a therein) to the line 112 based on the duty ratio signals, while the solenoid valve 155 is disposed between a hydraulic line 113 connected to the line 112 and a hydraulic line 114 that communicates with the drain through an orifice 114a, to control the flow of the hydraulic oil from the line 113 to the drain based on the duty signals.

Therefore, to the right cylinder chamber 84 via the line 110 is applied the charge pressure regulated by the charge pressure relief valve 12, while to the left cylinder chamber 83 is applied a pressure from the line 112 lower than the charge pressure, by the action of the aforesaid two solenoid valves 155 and 156. In this connection, the force applied on the piston member 82 from the right side (that is, a force due to the hydraulic pressure P1 in the right cylinder chamber 84 plus the force of the spring 87) balances with the force applied on the piston member 82 from the left side (that is, a force due to the hydraulic pressure P2 in the left cylinder chamber 83), even when P2 is lower than P1, because the area of the right cylinder chamber 84 subject to oil pressure is designed to be much smaller than that of the left cylinder chamber 83. Therefore, if the solenoid valves 155 and 156 control the hydraulic pressure (in the left cylinder chamber 83) supplied from the line 112 so as to be larger than a balance pressure P2, the piston member 82 will be moved to the right, and if the solenoid valves 155 and 156 control the hydraulic pressure in the left cylinder chamber 83 supplied from the line 112 so as to be smaller than the balancing pressure P2, the piston member 82 will be moved to the left.

The movement of the piston member 82 to the left or right is transmitted to the clutch valve 5 through a link 88. The clutch valve 5 consists of a stationary member 5a having a first valve port 5b therein, and a rotary member 5c having a second valve port 5d rotatably inserted in the stationary member 5a. An arm 5e engaging the rotary member 5c is connected to the aforesaid link 88, thus allowing a rotation of the rotary member 5c in accordance with the movement of the aforesaid piston member 82. When the rotary member 5c is rotated, the communication between the first and second valve ports 5b and 5d varies from "fully open" to "fully closed". When the piston member 82 is moved to the leftmost as shown in FIG. 2, the communication in the clutch valve 5 is "fully open", while as the piston member 82 moves to the right, the communication varies gradually to "fully closed".

Because the first valve port 5b communicates with the first line La and the second valve port 5d communicates with the second line Lb constituting the hydraulic closed-circuit, the variation in the communication between the aforesaid first and second valve ports 5b and 5d can change the opening degree of the seventh line Lg or the short circuit line between the first and second lines La and Lb, thus effecting clutch control. In other words, based on the signal from the controller 100, duty-ratio control of aforesaid solenoid valves 155 and 156 can perform a successful clutch control.

Figure 3:
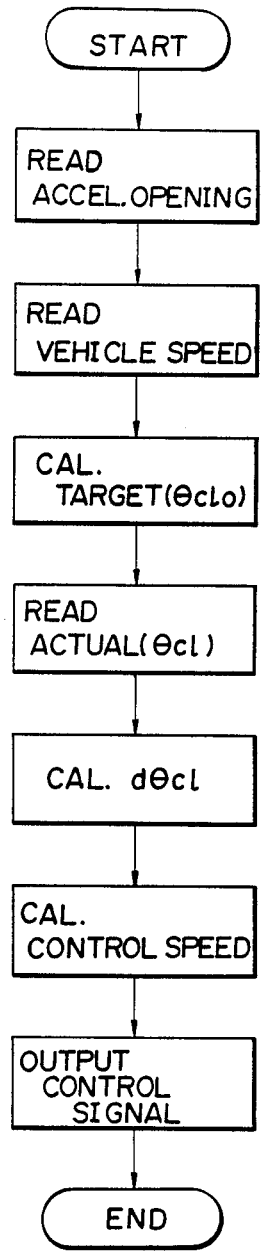
FIG. 3 is a flow chart showing the sequence of clutch opening control used in the first embodiment according to the invention.

In a continuously variable speed transmission of the aforesaid configuration using the first embodiment according to the invention, a method of controlling the opening of the clutch valve 5 by way of the duty ratio control of the solenoid valves 155 and 156 now will be more specifically described based on the flow chart in FIG. 3.

Figure 4A:
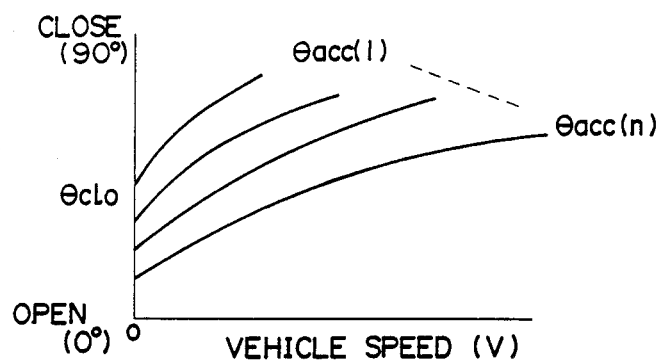
FIG. 4A is a graph showing a relation between vehicle speed and reference clutch opening for each accelerator opening.

This control starts with reading an accelerator opening $\theta$acc based on the depression of an accelerator pedal or a throttle opening of the engine and also starts with reading vehicle speed. In the specification and the claims, "accelerator opening" implies a parameter representing the operator's intention to accelerate or decelerate, corresponding for instance to the depression of the accelerator pedal or the opening of the throttle. As for the depression of the accelerator pedal, a fully released condition corresponds to a full-closed condition of accelerator opening, while a full depressed condition corresponds to a full open condition of accelerator opening. Next, a reference clutch opening $\theta$clo corresponding to the accelerator opening $\theta$acc is calculated from the graph shown in FIG. 4A. In FIG. 4A, the reference clutch openings $\theta$clo are preset as functions of vehicle speed V for each accelerator opening $\theta$acc(1), . . . or $\theta$acc(n), and when the vehicle speed V and the accelerator opening $\theta$acc are read the reference clutch opening $\theta$clo can be calculated to make a smooth clutch engagement corresponding to these values. With regard to accelerator openings, $\theta$acc(1) is an opening corresponding to a full-closed condition of the throttle, the throttle opening will increase with increasing number (n), and $\theta$acc(n) represents a full-open condition of throttle. Reference clutch opening $\theta$clo is 90 degree (maximum) when fully closed, goes to a smaller value when approaching a release side, and finally becomes 0 degree when fully opened. The opening degree of the clutch may be referred to as the clutch capacity. Likewise, in a friction clutch apparatus, the degree of engagement of the friction clutch may be referred to as the clutch capacity.

Figure 4B:
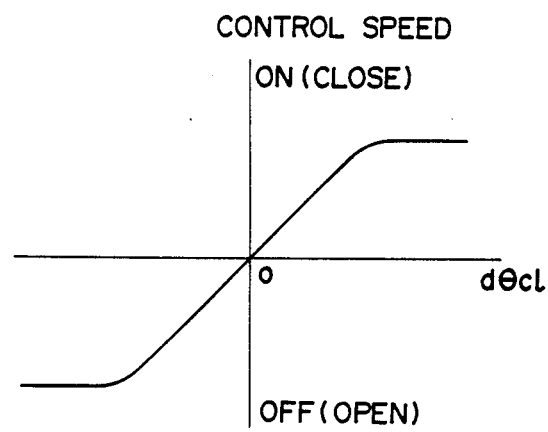
FIG. 4B is a graph showing the relation between clutch opening difference and clutch opening control speed.

Then, actual clutch opening $\theta$cl is read to calculate an opening difference $d\theta$cl ($=\theta$clo$-\theta$cl) between the reference clutch opening $\theta$clo as calculated above and an actual clutch opening $\theta$cl. Based on the opening difference $d\theta$cl, from the graph in FIG. 4B, a clutch opening control speed is calculated. The control speed is, as apparent in FIG. 4B, given in the direction to close (switch ON) the clutch with a magnitude proportional to the opening difference $d\theta$cl when the opening difference $d\theta$cl is positive, that is when the reference clutch opening $\theta$clo is wider than the actual clutch opening $\theta$cl (the reference clutch opening $\theta$clo is on the closed side). While the control speed is given in the direction to open (switch OFF) the clutch with a magnitude proportional to the opening difference $d\theta$cl when the opening difference $d\theta$cl is negative, that is, when the reference clutch opening $\theta$clo is narrower than the actual clutch opening $\theta$cl (the reference clutch opening $\theta$clo is on the open side).

The opening or closing of the clutch valve 5 is controlled by the calculated speed. Therefore, when the actual clutch opening $\theta$cl is far away from the reference clutch opening $\theta$clo, the opening of the clutch is controlled by a faster control speed so as to rapidly move the actual clutch opening $\theta$cl to the reference clutch opening $\theta$clo, while when the clutch openings come closer the control speed becomes slower, thereby allowing the actual clutch opening $\theta$cl to gradually reach the reference clutch opening $\theta$clo.

Such control as described above without using the engine speed as control information can eliminate the influence of the time lag in the increase in engine speed. Also, a smooth ON/OFF operation of the clutch can be expected in the case of a rapid depression of accelerator the pedal.

As described above, the first embodiment can eliminate the need for using the engine speed as control information for clutch opening, thus avoiding an inappropriate control of clutch opening due to such time lag in the increase in engine speed as seen in for example an abrupt depression of the accelerator pedal, thereby preventing a excessive increase of engine speed and a hunting of engine rotation due to improper clutch control at the start of vehicle.

Figure 5:
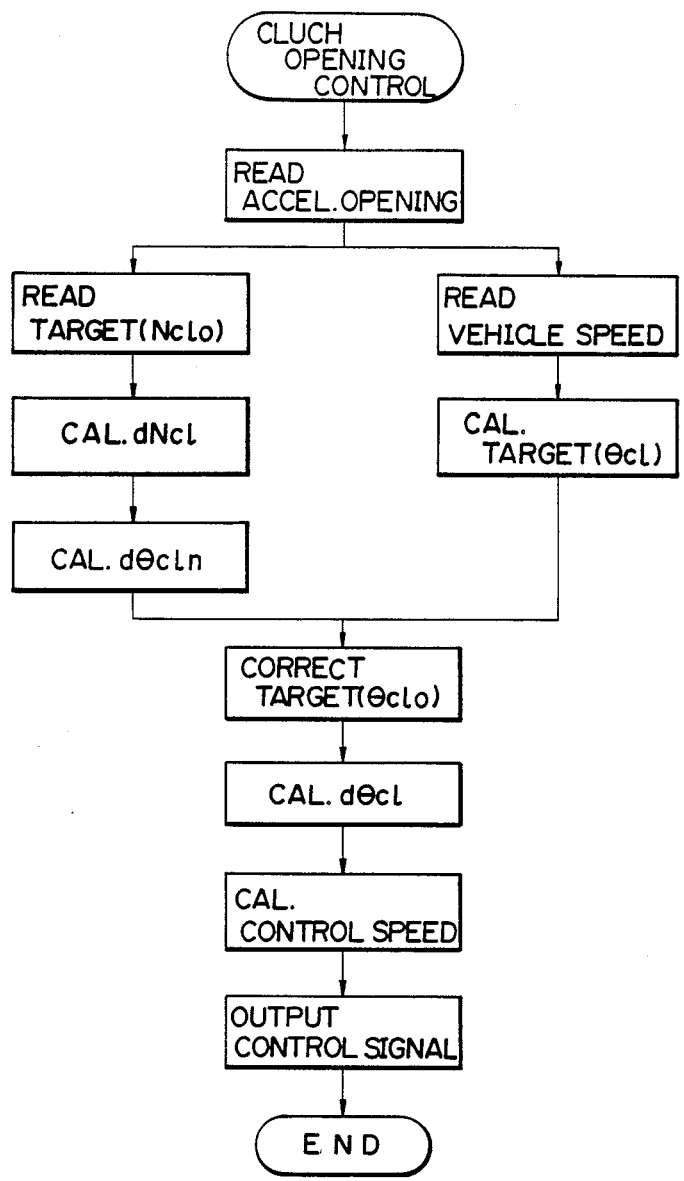
FIG. 5 is a flow chart showing the algorithm of clutch opening control used in the second embodiment according to the invention.

A method of controlling the opening of the clutch valve 5 in the second embodiment according to the invention now will be specifically described based on the flow chart in FIG. 5.

Figure 6A:
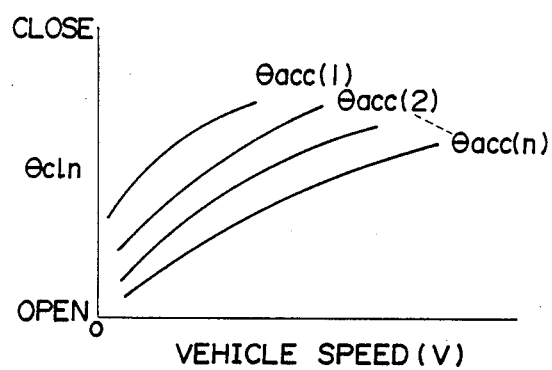
FIG. 6A is a graph showing a relation between vehicle speed and reference clutch opening for each accelerator opening.
Figure 6B:
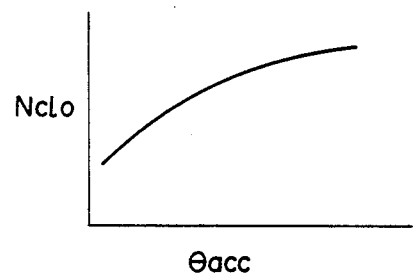
FIG. 6B is a graph showing the relation between accelerator opening and reference clutch engagement speed.

This control starts with reading an actual accelerator opening $\theta$acc corresponding to actual throttle opening, and then reads a reference clutch engagement speed Nclo corresponding to the actual accelerator opening $\theta$acc. The reference clutch engagement speed means an engine speed at which the clutch is properly engaged to have a smooth start for the present accelerator opening, and is determined by reading a reference speed for the actual accelerator opening using a preset relation curve (FIG. 6B) between the accelerator opening $\theta$acc and the reference clutch engagement speed Nclo.

Figure 6C:
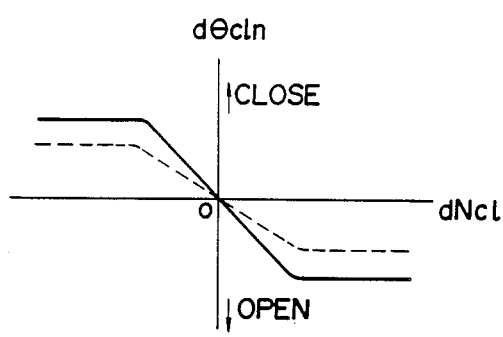
FIG. 6C is a graph showing the relation between speed difference and clutch opening correction.

Then a speed difference dNcl ($=$Nclo$-$Ne) between the reference clutch engagement speed Nclo and the actual engine speed Ne is calculated, and also a clutch opening correction d$\theta$cln is read from FIG. 6C. The correction is a negative value (toward clutch opening) when the speed difference dNcl is positive, while it is positive (toward clutch closing) when the difference is negative.

On the other hand, an actual vehicle speed V is read while the clutch opening correction d$\theta$cln is calculated, and a basic reference clutch opening $\theta$cln is calculated based on the actual vehicle speed V and the actual accelerator opening $\theta$acc. This calculation is made based on the actual vehicle speed V and the actual accelerator opening $\theta$acc using the graph (FIG. 6A) showing basic reference clutch openings $\theta$cln preset corresponding to the vehicle speeds V for accelerator openings $\theta$acc(1), $\theta$acc(2), ... $\theta$acc(n). $\theta$acc(1) corresponds to throttle to read; and $\theta$acc(n) is that for throttle full-closed. $\theta$cln varies from 0 degree to 90 degrees.

Further, the clutch opening correction d$\theta$cln varies according to a difference d$\theta$cl1 between the basic reference opening $\theta$cln and the actual clutch opening $\theta$cl to secure proper engine speed and power. More specifically, a relatively large correction is set as shown by the solid line in FIG. 6C when the difference d$\theta$cl1 is smaller than a given opening $\theta$clg, while a smaller correction than the above (solid line) is set as shown by the broken line in FIG. 6C when the difference d$\theta$cl1 is larger than a given opening $\theta$clg.

Then, the calculated basic reference clutch opening $\theta$cln and the clutch opening correction d$\theta$cln are added to obtain a corrected reference clutch opening $\theta$clo (the basic reference clutch opening $\theta$cln is corrected by the clutch opening correction d$\theta$cln). This addition corrects the reference clutch opening toward the opening direction when the actual engine speed Ne is lower than a reference clutch engagement speed Nclo (dNcl is positive), while the reference clutch opening is corrected toward the closing direction when the actual engine speed Ne is higher than the reference clutch engagement speed Nclo (dNcl is negative).

Then, the difference d$\theta$cl ($=\theta$clo$-\theta$cl) between the corrected reference clutch opening $\theta$clo and the actual clutch opening $\theta$cl is calculated to obtain a clutch opening control speed Scl from the graph in FIG. 4B. As FIG. 4B shows, the control speed Scl is set toward the engagement direction (ON direction) to close the clutch valve 5 when the difference d$\theta$cl is positive, while the control speed Scl is set toward the disconnection direction (OFF direction) to open the clutch valve 5 when the difference d$\theta$cl is negative. And, when the difference d$\theta$cl is outside a given range, the speed Scl becomes substantially constant.

After control speed is calculated as described above, an appropriate actuation signal is outputted from the controller 100 to the solenoid valves 155 and 156 so as to actuate the clutch valve 5 according to the control speed Scl.

Such a control as described above allows the reference clutch opening to be corrected toward the closed direction of the clutch when the throttle is suddenly opened at the start of the vehicle. Also, the control allows the clutch opening speed to be controlled in accordance with the difference between the reference clutch opening and the actual clutch opening. This permits a more desirable partially engaged clutch condition, thus obtaining a smooth clutch engagement.

The above exemplifies a control method based on the corrected reference clutch opening which is obtained by a correction (using a clutch opening correction amount) of the basic reference clutch opening calculated based on actual vehicle speed and actual accelerator opening. But, a control may be made based on the very basic reference clutch opening without a correction. In other words, after the clutch opening control speed is obtained from the difference between the basic reference clutch opening and the actual clutch opening, a control may be made based on the control speed so as to have the clutch opening in agreement with the basic reference clutch opening. But, the control based on the corrected reference clutch opening can effect a better control for abrupt change in clutch opening, thus ensuring a positive prevention of hunting or abrupt increase of engine speed.

The above illustrates a control method of clutch opening in the case of clutch engagement at the start of the vehicle. Also, in the case of clutch disengagement at the stop of a vehicle, this control can be used for bringing vehicles to a smooth stop.

Figure 7:
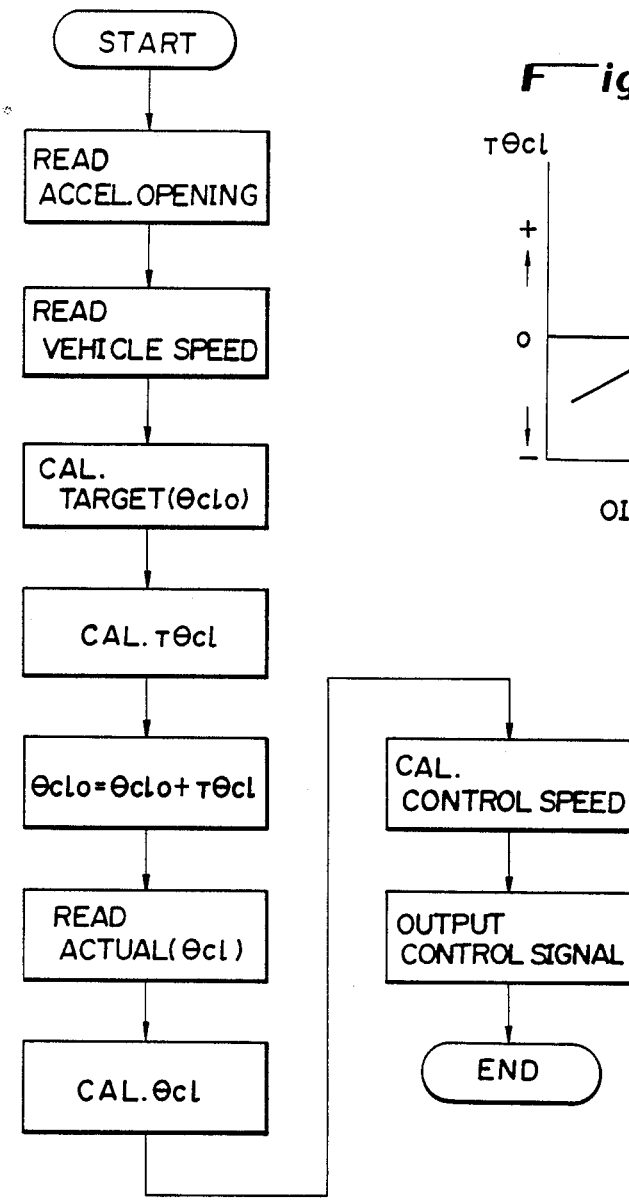
FIG. 7 is a flow chart showing the algorithm of clutch opening control used in the third embodiment according to the invention.

A method of controlling the opening of the clutch valve 5 in the third embodiment according to the invention now will be specifically described based on the flow chart in FIG. 7.

This control begins with reading an accelerator opening $\theta$acc from a depression of the accelerator pedal or a throttle opening of the engine as well as with reading a vehicle speed V. Following this, a reference clutch opening $\theta$clo corresponding to the accelerator opening $\theta$acc is determined from the graph in FIG. 4A. In FIG. 4A, for every accelerator opening $\theta$acc(1) ... $\theta$acc(n), reference clutch openings $\theta$clo corresponding to the vehicle speeds V are preset. When the vehicle speed and the accelerator opening $\theta$acc are read, a reference clutch opening $\theta$clo can be calculated so as to have a smooth clutch engagement when oil temperature Toil is a given temperature T1.

Figure 8:
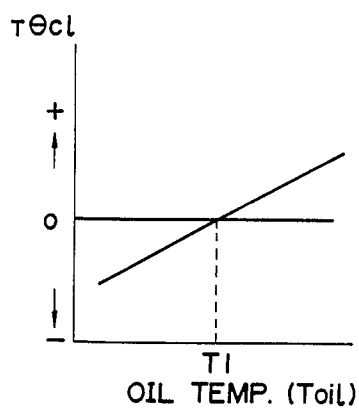
FIG. 8 is a graph showing a relation between oil temperature Toil and clutch opening correction $T\theta Cl$ corresponding to the oil temperature Toil.

Next, a temperature Toil of hydraulic oil in the hydraulic closed circuit is detected to calculate a reference clutch opening correction T$\theta$cl for the detected oil temperature Toil using the graph in FIG. 8. The correction T$\theta$cl is zero when the detected oil temperature Toil is equal to the given oil temperature T1, and is given a negative value (to correct the clutch valve toward the open direction) when the detected oil temperature Toil is lower than the given oil temperature T1, while the correction T$\theta$cl is given a positive value (to correct toward the closed direction of the clutch valve) when the detected oil temperature Toil is higher than the given oil temperature T1. Then, the correction amount T$\theta$cl is added to the reference clutch opening $\theta$cl for correction.

After that, the actual clutch opening $\theta$cl is inputted to calculate an opening difference d$\theta$cl ($=\theta$clo$-\theta$cl) between the reference clutch opening $\theta$clo and the actual clutch opening $\theta$cl. Then, a clutch opening control speed is calculated from the graph in FIG. 4B using the opening difference $d\theta$cl.

Opening or closing of the clutch valve 5 is controlled by the speed thus calculated. Here, when the actual clutch opening $\theta$cl is far away from the reference clutch opening $\theta$clo, the clutch opening is controlled with a fast control speed so that the actual clutch opening $\theta$cl quickly approaches the reference clutch opening $\theta$clo. As the clutch openings approach each other, the control speed becomes so slow that the actual clutch opening $\theta$cl is gradually moved toward the reference clutch opening $\theta$clo.

Such control as described above can adjust the clutch opening according to the viscosity variation of hydraulic oil due to the temperature change, thereby maintaining the same clutch transmission capacity for various accelerator openings, thus realizing a constant, smooth ON/OFF operation of the clutch independent of oil temperatures. More particularly, when the temperature of hydraulic oil is low, a high oil viscosity reduces oil flow through the clutch valve, and therefore the opening of the clutch valve is controlled to be enlarged so as not to reduce the oil flow through the clutch valve. As a result, even under the cold condition there is no chance of increasing engine load in starting, thus preventing the engine from being stalled. When oil temperature is high, in contrast the opening of clutch valve is controlled to the reduced.

In the above embodiment, the reference clutch opening is set in accordance with the vehicle speed and the accelerator opening, and the reference clutch opening is further corrected based on oil temperatures, but the reference clutch opening may be set in accordance with a combination of the engine speed and the accelerator opening or other operational conditions.

Furthermore, in the above embodiment a detailed description is given to a method of opening control of the clutch valve to control the opening of the bypass line in the hydraulic closed circuit of a hydraulic continuously variable speed transmission, but the invention is not limited to that. The method can be applied to the clutch device using the frictional clutch plates as seen in the prior art such as gear type or other type transmissions.

Figure 9:
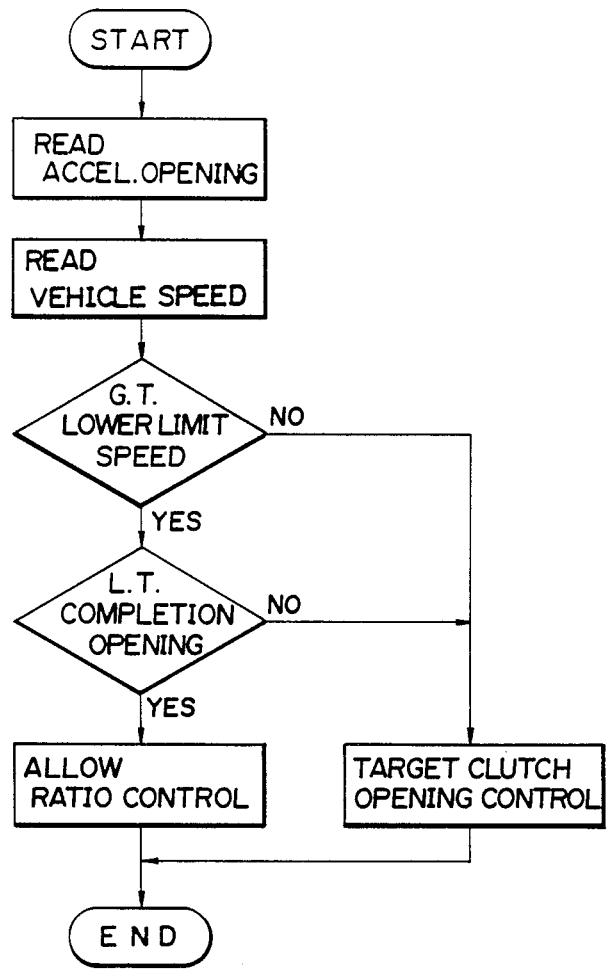
FIG. 9 is a flow chart showing the algorithm of a method for determining clutch engagement completion used in the fourth embodiment according to the invention.

In a continuously variable speed transmission using the fourth embodiment according to the invention, a method of controlling openings of the clutch valve 5 by way of the duty ratio control of the solenoid valves 155 and 156 now will be specifically described based on the flow chart in FIG. 9.

Figure 10A:
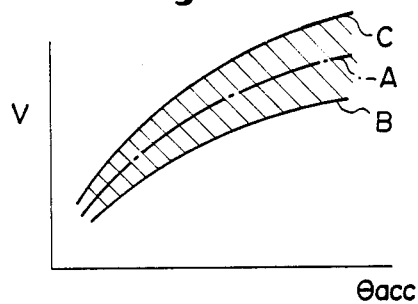
FIG. 10A is a graph showing a planned range of clutch engagement completion vehicle speeds for accelerator opening.

In this control, first of all, an accelerator opening $\theta$acc is read and a vehicle speed V is inputted from a vehicle speed sensor. Then, the inputted vehicle spped is determined whether it is above a lower limit of an expected clutch engagement completion vehicle speed. This "expected clutch engagement completion vehicle speed" is a vehicle speed at which clutch engagement is expected to be completed when a vehicle is to be smoothly started through a partial-engaged clutch condition at the start of vehicle. As shown by a dashed line A in FIG. 10A, the expected clutch engagement completion vehicle speeds can be predefined for various accelerator openings.

In the vehicle speeds can be measured exactly, by judging whether a point which represents the measured speed and the present accelerator opening lies right on the dashed line can be determined the completion of clutch engagement. But the accuracy of the vehicle speed detected by the speed sensor normally onboard is rough since the vehicle speed is low when the clutch is engaged. The detected speed has variations within the range hatched in FIG. 10A. Therefore, the vehicle speed detected by the vehicle speed sensor is not enough to judge whether the clutch engagement has been completed.

For this reason, in the method according to the invention, previously a characteristic line (solid line B) representing the lower limit of the range shown by hatching in the drawing is established, and first of all it is determined whether the vehicle speed V detected by the vehicle speed sensor is above the lower limit (whether there is a possibility that clutch engagement is completed).

When the detected vehicle speed is below the lower limit, i.e., clutch engagement has not been completed, in order to realize partial-engaged clutch state for a smooth start, the opening of the clutch is controlled so as to coincide with a reference clutch opening which is set in accordance with the engine speed and the accelerator opening.

Figure 10B:
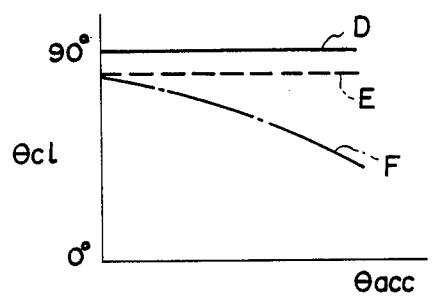
FIG. 10B is a graph showing clutch engagement completion opening for accelerator opening.

On the other hand, when the detected vehicle speed is over the lower limit (when there is a possiblility that the clutch engagement is completed), it is determined whether the clutch opening is wider than a clutch engagement completion opening. The clutch engagement completion opening is a clutch opening at which the clutch engagement control state can be smoothly shifted to the speed reduction ratio control state, and also at which the clutch valve 5 is almost closed (the rotation angle of the rotation member 5c is very close to 90 degrees). As a result, as shown in FIG. 10B, the opening of the clutch valve 5 is set to a value represented by a broken line E or a dashed line F which is on the open side of the full-closed line D. In the case of the broken line E, a constant opening is set in spite of the accelerator opening. While in the case of the dashed line F, the wider the accelerator opening is, the wider the clutch engagement completion opening is toward the open side.

Then it is determined whether the clutch opening is below the expected clutch engagement completion opening. When the determination shows that the clutch is not yet closed to the completion opening, even if the vehicle speed is higher than a speed at which the clutch is expected to complete the engagement, the clutch valve opening is so controlled as to coincide with the reference clutch opening which is set in accordance with the engine speed and the accelerator opening to realize smooth starting of the vehicle.

On the other hand, when the vehicle speed is above the lower limit and when the clutch opening is below the expected clutch engagement completion opening, a speed reduction control is allowed to gradually reduce the speed reduction ratio for a smooth acceleration since the clutch engagement is judged to the completed.

Figure 11:
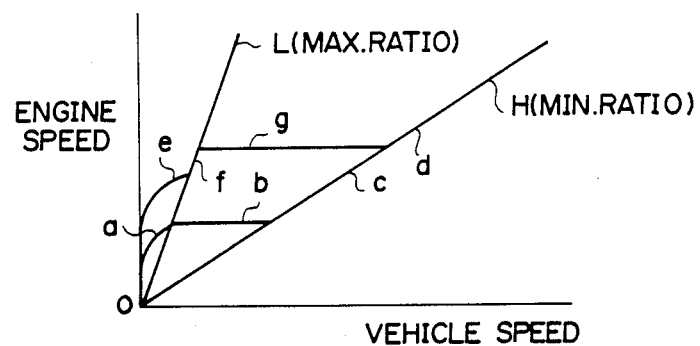
FIG. 11 is a graph showing running characteristics of aforesaid the continuously variable speed transmission.

In this connection, a method of a vehicle running control which includes the clutch engagement control and the speed reduction ratio control will be described using FIG. 11. The ordinate and abscissa of the drawing respectively represent the engine speed and the vehicle speed, and the solid lines L and H respectively represent the relation between engine speed and vehicle speed with maximum and minimum speed reduction ratios. In starting the vehicle, first the engine is in the idling condition with zero vehicle speed, then the accelerator is depressed (the accelerator opening becomes larger) and the engine will gather speed while the clutch valve is closed to engage the clutch, whereby the vehicle is driven. In this clutch engagement, the engagement completion engine speed and the vehicle speed vary with the magnitude of the accelerator opening. When the accelerator opening is wide, the clutch is engaged at a high engine speed as shown by the line "e" in the drawing, while when the accelerator opening is narrow, the clutch is engaged at a low engine speed as shown by the line "a".

The completion of the clutch engagement is judged by the method shown in the flow chart in FIG. 9. When the clutch engagement is judged to the completed, the speed reduction ratio control is initated, whereby the control is smoothly shifted to a regular speed reduction ratio control (but when the accelerator opening is wide, the vehicle speed is increased with the speed reduction ratio maintained maximum before the speed reduction ratio control begins as shown in a line "f"). Then the speed reduction ratio is changed from the maximum to the minimum (refer to line "b" or "g") so that the vehicle speed is increased with the engine speed being maintained substantially constant. After the speed reduction ratio has become minimum, the vehicle speed increases as the engine speed increases with the speed reduction ratio being maintained minimum (as shown by line "c" and "d").

In the above embodiment according to the invention adapted for a hydraulic continuously variable speed transmission, a detailed description is given to a method of determining clutch engagement completion, however the invention is not limited to the above embodiment but relates to other continuously variable speed transmissions as well.

As conventional detection methods of detecting clutch engagement completion, there have been such methods as to be performed based on the relation between the engine speed and the vehicle speed, the relation between the throttle opening (the accelerator opening) and the vehicle speed and etc. But since the clutch is engaged when the vehicle speed is slow and the vehicle speed sensor normally onboard is poor in accuracy when the vehicle speed is slow, all methods according to the prior art have been liable to have a difference between the time when clutch engagement is actually completed and the time when clutch engagement completion is detected. Therefore, for example if the clutch engagement completion is detected before actual clutch engagement is completed, the detection will initiate the speed ratio control without the clutch fully engaged, thus causing a problem that engine speed will drop because the speed reduction ratio has become small when clutch engagement is actually complete. On the other hand, if the clutch engagement completion is detected after the clutch engagement is completed, the start of the speed ratio control will be late, thus causing a problem that the engine speed will go too high or a feeling of acceleration will be unfavorable.

On the contrary, considering that the detection accuracy of the speed sensor is rough when the clutch is engaged since the vehicle speed is very low, the method according to the invention comprises predefining the lower limit of the expected clutch engagement completion vehicle speed, determining that clutch engagement has been completed after the vehicle speed (detected by the vehicle speed sensor) becomes higher than the lower limit and after the clutch opening has become smaller than a given value, and allowing the speed change control. Therefore, the method according to the invention can accurately determine the completion of clutch engagement, thereby obtaining a smooth and good-feeling shift from the clutch engagement control state to the speed reduction ratio control state.

Using the fifth embodiment according to the invention, a method of controlling the opening of the clutch valve 5 by way of the duty ratio control of the solenoid valves 155 and 156 now will be more specifically described.

Basically, as shown in FIG. 4A, the clutch opening is controlled by predefining a reference clutch opening corresponding to a combination of the accelerator opening $\theta$acc and the vehicle speed so so as to have a smooth start and stop of the vehicle; the controller 100 outputs duty ratio signals to the solenoid valves 155 and 156 so that the opening of the clutch valve 5 coincides with the reference clutch opening corresponding to the accelerator opening $\theta$acc and the vehicle speed detected (hereinafter this control is referred to as "basic control").

Figure 13:
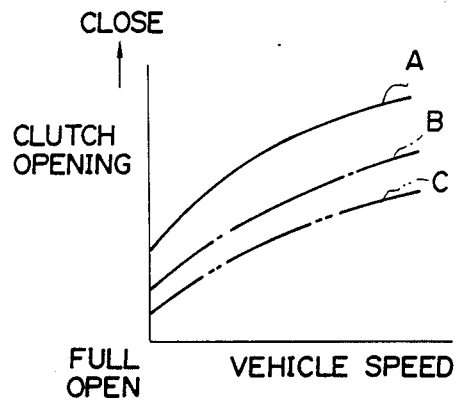
FIG. 13 is a graph showing the relation between vehicle speed and reference clutch opening in the creep control.

Exceptionally, when a transmission is in running range (i.e., when the transmission is in what is often commonly referred to as a Drive-range, Low-range, or other state in which engine power may be transmitted through the transmission to the wheels, as opposed to a neutral-type state in which engine power may not be transmitted through the transmission to the wheels) and the vehicle is in such a creep condition that the accelerator opening $\theta$acc is smaller than a predetermined value or essentially in the full-closed condition, the control as shown in FIG. 13 is performed. First of all, when there is not any load such as electric load, air conditioner's load, brake actuation load and etc., the reference clutch opening corresponding to the vehicle speed as shown by line A is preset, and control is made so that the opening of the clutch valve 5 coincides with the reference clutch opening (the reference clutch opening is the same as that set corresponding to the throttle opening in FIG. 4A). And, for instance, when the engine load is increased by brake actuation, the reference clutch opening corresponding to the vehicle speed is corrected toward the open side as shown by dashed line B, and a load-responsive control is performed so that the opening of the clutch valve 5 coincides with the corrected reference clutch opening. Therefore, the creep force during braking is minimized to prevent a creeping of the vehicle by a light braking action and to suppress the transmission of engine vibrations.

Further, for example when the air conditioner is actuated during creep condition to increase engine load, a load-responsive control is performed so that: the reference clutch opening corresponding to the vehicle speed is corrected toward the open side as shown by two-dot chain line C in FIG. 13, and the opening of the clutch valve 5 coincides with the corrected opening. As a result, when, under a low-speed creeping condition, the air conditioner is actuated, the opening of the clutch valve 5 is widened. Therefore, even if air intake is increased corresponding to an increase in engine load to increase engine power, the increased opening of the clutch valve 5 can maintain the creep force constant.

Figure 12:
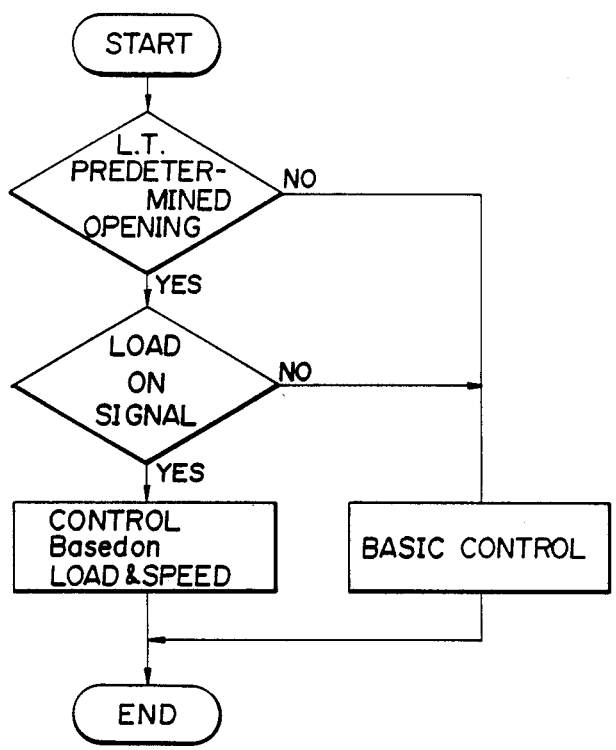
FIG. 12 is a flow chart showing the algorithm of a method for determining clutch engagement completion used in the fifth embodiment according to the invention.

Here, such a control according to the invention as described above (in FIG. 4A and FIG. 13) is illustrated step by step using the flow chart in FIG. 12.

The control according to the invention, which is to be performed while a transmission is in the running range includes a step of determining whether the accelerator opening is smaller than a given value. When it is above the value, the basic control as shown in FIG. 4A is performed because the vehicle is not in the creep condition. On the contrary, when the accelerator opening is below the given value (the vehicle is in the creep condition), it is judged if there is any change in engine load such as brake application or air conditioner operation. If there is no change in engine load, the control goes to the basic control: setting a reference clutch opening (the opening shown by solid line A in FIG. 13) corresponding to a combination of the acceleration opening and the vehicle speed. On the contrary, if there is any change in engine load, the control goes to the load-responsive control: correcting the reference clutch opening as predefined in correspondence with load type as shown in FIG. 13, and pursing the corrected reference clutch opening.

In the above embodiment according to the invention, a detailed description is given to a method of creeping control for a hydraulic continuously variable speed transmission, however the method of creeping control (using the clutch opening control) according to the invention is not limited to the above embodiment but can be applied as well to other variable speed transmissions for vehicles provided with a clutches that can control the clutch opening (transmitted torque capacity of the clutch).

As described above, the embodiments according to the invention can perform the following. When the engine load is varied in the creep condition, a load-responsive control of the clutch opening corresponding to the load change is introduced. Therefore, even if air intake is increased in response to the increase in engine load to increase engine power, the creep force is kept constant by increasing the clutch opening, thus avoiding the affect of the change in engine load on creep running. And, when brakes are applied in the creep condition, the creep force is minimized by increasing the clutch opening, thus positively bringing the creeping vehicle to a stop by a light brake application and improving driver's feeling by suppressing the transmission of engine vibrations. And further, as described above, since the clutch opening is increased as the engine load increases in the creep condition the engine load required for the creep force is minimized, thereby reducing fuel consumption.

The invention being thus described, it will be obvious that the same may be varied in many ways. Such variations are not to be regarded as a departure from the spirit and scope of the invention, and all such modifications as would be obvious to one silled in the art are intended to be included within the scope of the following claims.

What is claimed is:

1. A method of controlling clutch operation, for a vehicle having a transmission which transmits engine power to wheels and clutch means which controls an actual power transmitted through said transmission comprising the steps of:
    setting a reference capacity of said clutch means corresponding to a parameter representing vehicle speed and a parameter representing a driver's intention of acceleration;
    and controlling said actual power transmission through said transmission by adjusting the capacity of said clutch means so as to coincide with said reference capacity.

2. A method of controlling clutch operation as defined in claim 1, wherein when said transmission is in a running range and said parameter representing driver's intention of acceleration is below a predetermined value, said reference capacity is so set that the vehicle is maintained in a creep condition where said clutch means permits the transmission to transmit a given creep power to the wheels, and when engine load is varied in the creep condition, said reference capacity is adjusted in response to the change in said engine load to keep the given creep power unchanged.

3. A method of controlling clutch operation as defined in claim 1, wherein when said transmission is in a running range and said parameter representing driver's intention of acceleration is below a predetermined value, said reference capacity is so set that the vehicle is maintained in a creep condition where said clutch means permits the transmission to transmit a given creep power to the wheels, and when vehicle braking is applied in the creep condition, said reference capacity is decreased to reduce the given creep power.

4. A method of controlling clutch operation as defined in claims 1, 2 or 3, wherein said transmission is a hydraulic continuously variable speed transmission comprising a hydraulic pump driven by the engine, a hydraulic motor driven by hydraulic force from the hydraulic pump, and a hydraulic closed circuit hydraulically connecting the hydraulic pump and motor, at least one of said hydraulic pump or motor being of variable displacement type;
    said clutch means is disposed in a bypass line by which a delivery side of said pump communicates with a suction side thereof in said hydraulic closed circuit and said clutch means includes a clutch valve to adjust opening of said bypass line.

5. A method of controlling clutch operation as defined in claim 4, comprising the steps of:
    detecting an actual parameter representing driver's intention of acceleration, and actual clutch opening of said clutch valve and an actual vehicle speed;
    setting a reference clutch opening based on said actual parameter representing driver's intention of acceleration and said actual vehicle speed;
    setting an opening control speed of said clutch valve based on a difference between said reference clutch opening and said actual clutch opening; and
    controlling said clutch valve in accordance with said opening control speed so that the opening of said clutch valve coincides with said reference clutch opening.

6. A method of controlling clutch operation as defined in claim 5, wherein the reference clutch opening of said clutch valve is corrected toward opening when oil temperature in said closed circuit is low, and toward closing when oil temperature in said closed circuit is high, and the opening of said clutch valve is so controlled as to be in agreement with said corrected reference clutch opening.

7. A method of controlling clutch operation as defined in claim 4, comprising the steps of;
    detecting an actual parameter representing driver's intention of acceleration, and actual clutch opening of said clutch valve and an actual vehicle speed;
    setting a reference clutch opening based on said actual parameter representing driver's intention of acceleration and said actual vehicle speed;

setting a reference clutch engagement speed corresponding to said actual parameter representing driver's intention of acceleration;
determining a corrected reference clutch opening corrected in accordance with the difference between said reference clutch engagement speed and an acutal engine speed of said engine;
setting an opening control speed of said clutch valve in accordance with a difference between said corrected reference clutch opening and said actual clutch opening; and
controlling said clutch valve in accordance with said opening control speed so that the opening of said clutch valve coincides with said corrected reference clutch opening.

8. A method of controlling clutch operation as defined in claim 4, further comprising the steps of:
setting a lower limit of an expected clutch engagement completion vehicle speed corresponding to a parameter representing the driver's intention of acceleration and deceleration;
determining, during vehicle starting, that said clutch valve is closed to engage the clutch completely when it is detected that vehicle speed is above the lower limit and the opening of said clutch valve is below a given opening; and then
permitting successive speed ratio control.

9. A method of controlling clutch operation as defined in claim 1, wherein said parameter representing driver's intention of acceleration is determined based on an accelerator opening.

* * * * *